United States Patent [19]

Mentschel

[11] 4,112,876

[45] Sep. 12, 1978

[54] METHOD AND APPARATUS FOR STARTING UP A GAS GENERATOR FOR CONVERTING HYDROCARBONS INTO A FUEL GAS, AND AN INTERNAL COMBUSTION ENGINE TO BE SUPPLIED WITH THE FUEL GAS

[75] Inventor: Hellmuth Mentschel, Erlangen, Germany

[73] Assignee: Siemens Aktiengesellschaft, Munich, Germany

[21] Appl. No.: 721,851

[22] Filed: Sep. 9, 1976

[30] Foreign Application Priority Data

Sep. 26, 1975 [DE] Fed. Rep. of Germany ....... 2542997

[51] Int. Cl.² .................................................. F02B 43/08
[52] U.S. Cl. .......................................... 123/3; 48/103
[58] Field of Search ............... 123/3, 119 E, 122 G, 123/179 G; 23/281, 288 J; 48/103, 107; 60/286, 300

[56] References Cited

U.S. PATENT DOCUMENTS

| 3,680,635 | 8/1972 | Berry | 23/288 J |
|---|---|---|---|
| 3,770,389 | 10/1973 | Kitzner | 23/288 J |
| 3,791,143 | 2/1974 | Keith | 60/300 |
| 3,796,207 | 3/1974 | Olson | 23/288 J |
| 3,915,125 | 10/1975 | Henkel | 123/3 |
| 3,926,850 | 12/1975 | Kostka | 123/3 |
| 3,954,423 | 5/1976 | Hamper | 123/3 |
| 3,982,910 | 9/1976 | Houseman et al. | 23/281 |
| 4,018,573 | 4/1977 | Mentschel | 123/3 |

FOREIGN PATENT DOCUMENTS

| 2,431,207 | 1/1976 | Fed. Rep. of Germany | 48/107 |
|---|---|---|---|
| 2,431,251 | 1/1976 | Fed. Rep. of Germany | 48/107 |

*Primary Examiner*—Charles J. Myhre
*Assistant Examiner*—Craig R. Feinberg
*Attorney, Agent, or Firm*—Kenyon & Kenyon Reilly Carr & Chapin

[57] ABSTRACT

A generator with a reaction chamber containing a catalytic charge for reacting liquid hydrocarbons with an oxygen containing gas to form a fuel gas is ignited by first electrically heating a part of the catalytic charge, preferably a part in front of the exit of the reaction chamber, to above the start up temperature of the catalyst. Then, the heating is terminated and an internal combustion engine which draws a hydrocarbon/air mixture with an air number higher than for normal operation over the hot volume of catalyst is started. The exothermic reaction which sets in there heats up the catalytic charge. Finally, the air number is throttled down and the transition to continuous operation is made.

6 Claims, 2 Drawing Figures

METHOD AND APPARATUS FOR STARTING UP A GAS GENERATOR FOR CONVERTING HYDROCARBONS INTO A FUEL GAS, AND AN INTERNAL COMBUSTION ENGINE TO BE SUPPLIED WITH THE FUEL GAS

BACKGROUND OF THE INVENTION

This invention relates to gas generators in general and more particularly to a method for starting up a gas generator for the catalytic reaction of hydrocarbons with an oxygen containing gas to form a fuel gas and for starting up an internal combustion engine which is to be supplied with the fuel gas, wherein catalytic material is temporarily electrically heated in a reaction chamber containing a catalytic charge; a mixture of hydrocarbons and air, richer in oxygen than the mixture used in continuous operation, is conducted over the catalytic material, is reacted there exothermically for further heating of the catalytic charge, and the fuel gas produced is fed to the internal combustion engine; as well as apparatus for implementing this method.

Gas generators can be used, for instance, to catalytically convert hydrocarbon containing fuels into a fuel gas which is better suited for the operation of internal combustion engines than liquid fuel. For, in internal combustion engines supplied with liquid fuel, for instance, in motor vehicles, the incomplete evaporation of the fuel and the uneven mixing with combustion air lead to incomplete combustion and emission of harmful substances. In addition, antiknock agents must as a rule be admixed to the fuel causing the content of substances in the exhaust gas which are harmful to the health to be increased further. The hazardous pollution of the air can largely be prevented if the internal combustion engine is operated with fuel gas. This fuel gas can be generated, as is described, for instance, in the U.S. Patent Application Ser. No. 633,609, in a reformed gas generator by partial catalytic oxidation of evaporated or vaporized liquid fuel with an oxygen containing gas, and the fuel gas then burned, together with additional combustion air, in the internal combustion engine. Since this fuel gas (reformed gas) has a high octane number, the addition of antiknock agents is not required.

A mixture of air and exhaust gas of the internal combustion engine, for instance, can be used as the oxygen containing gas for the reaction where the reaction is endothermic if the exhaust gas content is high and exothermic if the air content is high. To carry out the reaction, the catalyst must have an operating temperature which is above the start up temperature of the catalyst, the start up temperature of a catalyst being understood, as usual, to be that temperature at which the effect of the catalyst leads to a noticeable reaction. The operating temperature can be maintained by supplying heat to the generator from the outside, for instance, through an exchange with the hot exhaust gases of the internal combustion engine or by a supplemental electric heater. However, the temperature of the catalyst can also be controlled by changing the composition of the oxygen containing gas, i.e., the air/exhaust gas mixture, and by changing the thermal balance of the reaction accordingly. Thus, a compensation of the heat losses of the generator can be achieved by a light exothermic reaction.

In one known device a combustion chamber with a flame ignition plug is arranged at the entrance of the reaction chamber. In the combustion chamber a gasoline/air mixture is ignited simultaneously with the starting of the internal combustion engine connected to the reformed gas generator. The flaming combustion of the gasoline produces hot flame gases which are drawn by the internal combustion engine through the reaction chamber together with a further reaction mixture of gasoline and combustion air. These gases heat the catalytic charge contained therein up to the start up temperature of the catalyst. From then on, the reaction mixture in the reformed gas generator itself is reacted and the flame is extinguished.

In U.S. Pat. No. 3,954,423 and in U.S. Application Ser. No. 633,609, further starting devices which precede the inlet to the reaction chamber of the reformed gas generator, which consist of a starting generator with a separate starting catalyst of small volume are described. Upon starting the internal combustion engine, a gasoline/air mixture is also ignited in the starting generator. The hot flame gases of the latter are drawn by the internal combustion engine through the starting catalyst and heat the latter up quickly. Then, a gasoline/air mixture is fed to the starting catalyst and is converted there into a hot fuel gas which in turn is drawn, for heating up the catalytic charge of the reformed gas generator, through the reaction chamber of the latter. At the same time, the flame is extinguished. This generates a fuel gas with which the internal combustion engine can be operated without load, shortly after the internal combustion engine is started, even before the reformed gas generator itself is heated up to the operating temperature. However, the starting generator, which precedes the inlet to the reaction chamber, requires additional space of its own, although such space is relatively small.

In U.S. Pat. No. 3,915,125, a starting procedure is described which makes use of an electric starting device which is arranged in the interior of the reaction chamber and precedes at least part of the catalyst in the flow direction. This starting device may consist, for instance, of incandescent electric wires which are coated with catalytic material and are connected into an external circuit. To start the generator, the internal combustion engine is driven, for instance, by an electric starter, the external circuit is closed and a slightly understoichiometric hydrocarbon/air mixture is ignited at the incandescent wires. The strongly exothermic reaction initiated thereby, which may take place with a flame or will at least have a tendency to an ignition, allows hot gases to be produced which heat the catalytic charge to above the start up temperature of the catalyst. The reaction of the hydrocarbon/air mixture can also be initiated at an electric starting device which consists of an electric heater resistor of catalytic material. This heater resistor is heated by an external circuit until the catalytic charge is heated above the start up temperature of the catalyst. At the same time, with the further heating of the catalytic charge the throughput of hydrocarbons is increased step by step and the air supply is throttled until the catalyst is heated to a reaction temperature suited for continuous operation and the transition to continuous operation can be made.

In all known devices and starting methods, the hydrocarbon fuel is overstoichiometrically or slightly understoichiometrically reacted with air during starting, so that a short starting time of the gas generator is achieved through violent development of heat and the internal combustion engine, which is to be operated with the fuel gas produced, can be put in operation quickly. it is a disadvantage in such operation that, with this relatively large supply of air, in the flame gases and at the catalyst initiating the reaction, temperatures occur which may lead to damage of the temperature sensitive catalysts. In the interest of greater safety, moreover, methods would be preferable, in which a flame reaction of the reaction mixture is avoided. In addition, a product gas is generated, at the beginning of the starting process, which has only a low calorific value and which must be drawn through the generator by the internal combustion engine in order to heat up the catalytic charge. However, to accomplish this, the internal combustion engine must first be kept running by an external energy source until the generator produces a gas with a calorific value sufficient to operate the internal combustion engine. In this last described prior art method, the vehicle's external energy source, e.g., the starter battery is simultaneously loaded by the start up heater and by the starter motor.

SUMMARY OF THE INVENTION

It is an object of the present invention to provide a method and apparatus for starting a gas generator for generating fuel gas, and for starting an internal combustion engine to be supplied with the fuel gas, using an electrical start up heater in such a manner that no flame reaction takes place in the gas generator and thus, the occurrence of excessively high temperatures is avoided.

A further object is to avoid a condition where the starter battery has to supply an excessively large amount of power even for a short time.

Further objects are to insure that the gas generator delivers a fuel gas with sufficient calorific value even after a short start up time and that the device required for the starting process has a few additional components and requires as little space as possible.

According to the present invention, this problem is solved by electrically heating a small part of the volume of the catalytic charge at least to the start up temperature of the catalyst; terminating the electrical heating, driving the internal combustion engine, introducing the hydrocarbon/air mixture, reacting it at the heated part of the volume without flame and further heating the catalytic charge by the spreading of the exothermic reaction, and finally, feeding the hydrocarbons and the oxygen containing gas, to the generator with an oxygen component provided for the reaction in continuous operation after the catalytic charge is sufficiently hot.

The method according to the present invention thus proceeds in two stages. First, with the supply of hydrocarbon and air shut off, an electric start up heater, which is preferably embedded in the catalytic charge, is switched on and quickly heats up part of the volume of the catalytic charge. The temperature of this subvolume reaches the start up temperature of the catalytic material within a few seconds. For example, a subvolume of catalyst which, together with the fuel gas produced by reaction in the subvolume and, if necessary, with additional, unreacted hydrocarbons, in just sufficient to cover the demand of the internal combustion engine when idling can be heated up.

At the beginning of the second stage, the start up heater is switched off. Simultaneously or immediately thereafter, the hydrocarbon/air mixture is fed in and the internal combustion engine is started, for instance, electrically. By its suction, the reaction mixture is drawn through the generator. Since the start up heater is already switched off, the starter battery is not overloaded by the simultaneous operation of the start up heater and the starter motor. At first, the air content in the reaction mixture is increased over that of continuous operation. Where the air number $\lambda$ is understood to mean the ratio of the amount of air supplied to the amount of air required for stoichiometric combustion ($\lambda = 1$) of the hydrocarbons employed, then the air number of the mixture drawn in during the second starting phase can advantageously lie between about 0.3 and 0.4. If there are no cavities in the reaction chamber of the generator for a flame to develop, flame combustion is not possible with air numbers below 0.5. The fuel gas produced then also has a calorific value sufficient for the internal combustion engine to start up. The reaction zone of the exothermal reaction now spreads and heats up the catalytic charge quickly to the extent that in the continuous operation which follows the starting process, and during which the air number in the reaction mixture supplied is throttled down, the reaction mixture can be converted in the heated parts. If the internal combustion engine is not at first operated at full load after the starting process is completed, then it is not necessary to wait for continuous operation until almost the entire catalytic charge is heated to the operating temperature. As a rule, it will then be sufficient if part of the catalytic charge has reached the operating temperature. Even if the reaction mixture is at first not completely reacted, in the heated parts of the catalytic charge, a small content of unreacted fuel gases in the generated gas mixture will not lead to operating difficulties.

The method requires no voluminous components for its implementation. In addition, it ensures a quick and operationally safe starting of the generator and the internal combustion engine without excessively loading an external energy source.

It is advantageous to apportion the amount of the hydrocarbons supplied during the second start up phase in such a manner that the generated mixture of fuel and, possibly, unreacted hydrocarbons covers, but not substantially exceeds, the demand on the internal combustion engine when idling. The internal combustion engine can then keep running by itself during the second start up phase.

It is particularly advantageous if a part of the volume of the catalytic charge which is in the proximity of the outlet of the reaction chamber is heated electrically. In the reaction chamber of the gas generator, which is designed for continuous operation with a lower air number, i.e., for a less strongly exothermic reaction, the reaction of the more oxygen rich mixture first spreads in the catalytic charge. If the mixture is introduced here via the inlet of the reaction chamber, then the reaction takes place in a relatively narrow reaction zone which travels against the flow direction toward the inlet. Thus, layers of the catalytic charge lying one behind the other are heated up quickly, without the reaction always occurring in the same zones of the catalytic charge, which might heat up too much in this manner.

It is even more advantageous to feed at least part of the mixture directly to the heated subvolume, for instance, via an auxiliary feed line. After the reaction has spread through the catalytic charge, the mixture can then be fed to the entrance of the reaction chamber and the auxiliary feed line shut off.

Other reactors in which a reaction mixture is reacted exothermically at a catalyst can also be started in this manner. To this end, a partial volume of the catalyst adjacent to the outlet of the reaction chamber is first heated. This can be accomplished by electrical heating and a heavily exothermic reaction which takes place in this heated subvolume. Now, the reaction mixture is fed to the reaction chamber via the inlet with a composition which leads to a more strongly exothermic reaction than in continuous operation. The reaction front of the incipient reaction travels quickly through the catalyst toward the inlet. If the catalyst is sufficiently hot, then the reaction mixture can be fed into the reaction chamber with a composition sufficient for continuous operation. The reaction travels through the reaction chamber even more quickly if, during the starting process, the supply of the reaction mixture is throttled below the supply used in continuous operation, for which the reactor is designed. In some cases, for instance, with cylindrical catalyst chambers, this migration can also be achieved by throttling the supply alone without changing the composition of the reaction mixture.

When the internal combustion engine has exceeded a minimum speed sufficient for driving the electric generator, the reaction chamber can advantageously be heated if the temperature falls below the operating temperature. A temperature drop could be due, for instance, to interference in the gasoline supply and can be prevented by an electric heater, the energy for which is supplied, for instance, by the electric generator driven by the internal combustion engine itself.

The method according to the present invention is advantageously implemented with a generator which comprises a reaction chamber containing a catalytic charge, lines with metering devices for the supply of hydrocarbons and air to the reaction chamber, and an electric start up heater arranged in the reaction chamber, this electric start up heater being embedded in the catalytic charge. The start up heater is preferably embedded in a part of the catalytic charge, which is disposed in the vicinity of the outlet of the reaction chamber. The start up heater is preferably designed, with respect to the heating area and energy consumption, in such a manner that within a short time, at most within a few seconds, a part of the catalytic charge having a volume sufficient for the catalytic generation of an amount of fuel gas which largely covers the demand of the internal combustion engine when idling is heated up.

In order to keep the energy consumption low during the heating up period, the start up heater can advantageously be embedded in a catalytic material with a heat capacity as low as possible. At least the part of the catalytic charge surrounding the start up heater consists preferably of porous, ceramic hollow spheres or of inorganic fibers. For instance, hollow spheres of $\alpha$-aluminum oxide with about 2 to 3 mm diameter can be considered. These are commercially available as what is known as spherical corundum. Also a layer of felt-like fibers, such as quartz glass wool or aluminum oxide wool, is highly suited. The aluminum oxide can be additionally impregnated with catalytically active components. At temperatures between 750° and 800° C, the reaction of hydrocarbons with air sets in at such materials to form a fuel gas containing $CO$, $CO_2$, $H_2$ and $CH_4$ with a worthwhile yield.

In a particularly advantageous embodiment of the starting device, an auxiliary feed line opens into the reaction chamber in the vicinity of the start up heater. Through this auxiliary feed line, a more oxygen rich fuel/air mixture is fed to the subvolume of the catalyst heated by the start-up heater during the second start up phase. Preferably, a temperature sensor is provided in the vicinity of the start up heater, which indicates when the start up temperature in the subvolume of the catalyst is reached. In addition, a further temperature sensor can be arranged in the reaction chamber to indicate the spreading of the hot reaction zone into the catalytic charge. A supplemental heater attached at the reaction chamber, which may be coupled, for instance, to the further temperature sensor and switched on when the internal combustion engine is running, if the temperature in the reaction chamber drops below the operating temperature is also advantageous.

DETAILED DESCRIPTION OF THE INVENTION

Figure 1:
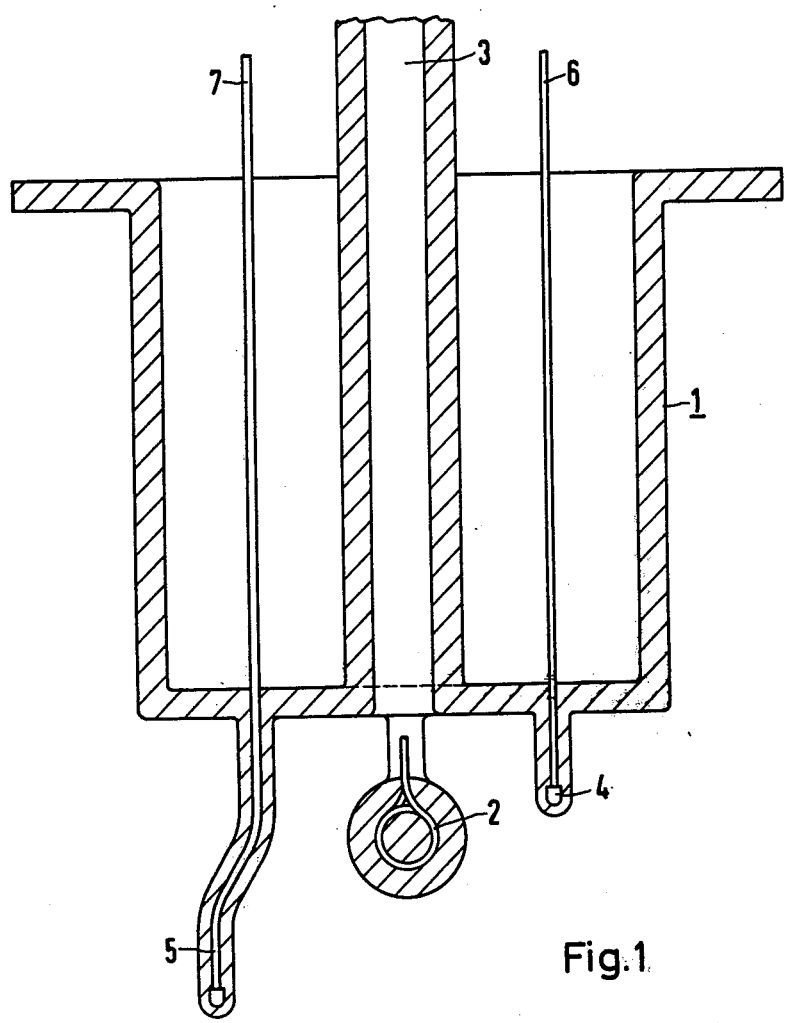
FIG. 1 is a longitudinal cross section through a start up heater designed as an insert for a generator with an auxiliary feed line.

The insert 1 shown in FIG. 1 is provided with an electric heater at its lower end which protrudes into the reaction chamber of the generator. Toward this lower end an auxiliary feed line 3 for the mixture of hydrocarbon and air is directed. In the insert 1, two temperature sensors 4 and 5 are also attached. The first temperature sensor 4 is arranged in the vicinity of the electric heater coil 2, and the other temperature sensor 5 at some distance therefrom. The lead wires of the electric heater coil, not shown in the figure, and the connecting cables 6 and 7 of the temperature sensors are surrounded by an insulating jacket and are brought out of the insert 1 to the control devices of the generator.

Figure 2:
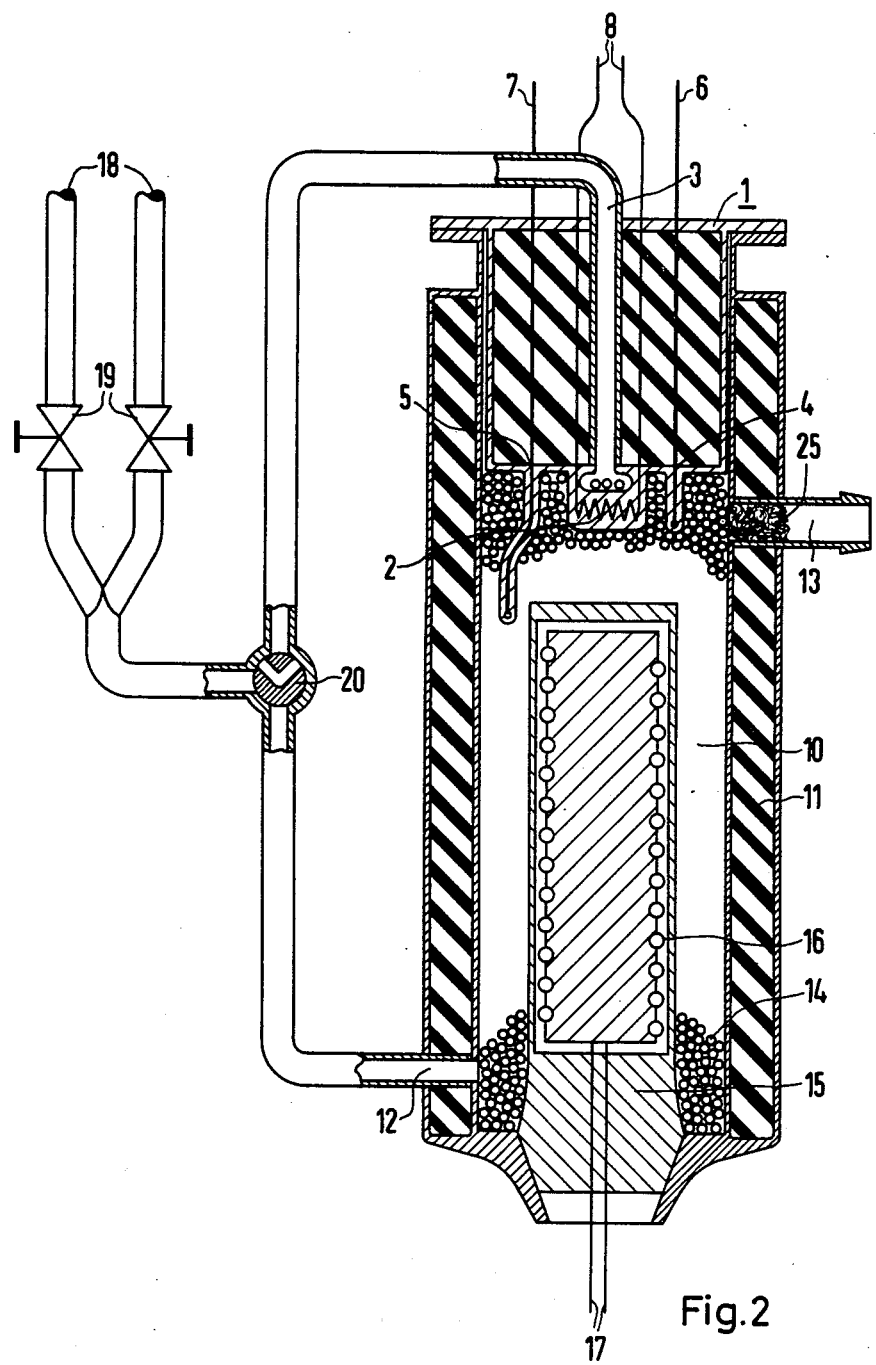
FIG. 2 is a schematic cross section through a generator equipped with the insert of FIG. 1 for carrying out the method according to the invention.

The generator shown in FIG. 2 consists of a cylindrical reaction chamber 10, which is surrounded by a double walled jacket 11 filled with insulating material. Chamber 10 has an inlet 12 for the raw materials of the reaction at one end and an outlet 13 for the product gas at the other end. The insert 1, of FIG. 1, with the parts labelled with the same reference numerals as FIG. 1, protrudes into the reaction chamber up to the outlet 13. A heater plug 15 with an electric heater winding 16 and connecting leads 17 protrudes further into the reaction chamber as a supplemental heater. The hydrocarbons and the oxygen containing gas are conducted via supply lines 18, which are equipped with adjustable metering valves 19, to a three-way valve 20, through which they are fed as desired to the auxiliary feed line 3 or to the inlet 12 of the reaction chamber 10.

The reaction chamber contains a bed of catalyst, e.g., spherical hollow bodies 14 of $\alpha$-$Al_2O_3$, known as spherical corundum, with a diameter of about 2 to 3 mm. The outlet of the reaction chamber is closed off by a plug 35 of aluminum oxide wool.

A heater coil 2 is embedded in the spherical corundum bed. It is fused into a quartz cylinder forming a heating surface of about 4 $cm^2$ and electricaly heats the catalytic material surrounding the heater surface to a depth of about two spherical corundum diameters.

However, the heater coil 2 can also be embedded in the aluminum oxide wool. The start up temperature of the aluminum oxide for the reaction of hydrocarbons such as gasoline, with air is at about 750° C, and at air numbers between 0.3 and 0.4. Reaction temperatures of between 800° and 1200° C are obtained. For continuous operation, temperatures of about 900° C and air numbers of between 0.1 and 0.3 are provided. The aluminum oxide may also be impregnated with an additional active component in order to catalyze, for instance, an endothermic reaction of hydrocarbons with an air/exhaust gas mixture.

In a series of tests, the generator shown in the figures was started by applying a voltage of 10 V from a voltage source to the terminals 8 of the start up heater 2. With a heater area of about 4 $cm^2$ and a current drain of about 17 amps, electric energy of less than 1 watt was required for the start up heater to bring the corundum spheres surrounding the start up heater to the start up temperature of about 750° C. Within 10 to 20 seconds, the temperature sensor 4 signalled via an indicator lamp connected to its connecting lead 6 that the start up temperature was reached. The start up heater was turned off and a hydrocarbon/air mixture was conducted into the reaction chamber. For this purpose, the one input of the three-way valve 20 was connected to a compressor for the air and the other input to a gasoline tank. The compressor was also connected with the gasoline tank via a branch line, to let the gasoline, which served as the hydrocarbon containing fuel, flow under pressure to the three-way valve 20. At the throttling devices 19, a gasoline/air mixture was adjusted which had a throughput of about 0.3 l/hr and an air number of about 0.35. By setting the three-way valve accordingly, the mixture was conducted via the auxiliary feed line 3 to the hot catalyst material, where the gasoline was evaporated and reached. After less than a minute, the temperature sensor 5 also indicated via an indicator lamp connected to its cable 7 that now, a larger volume of catalyst was heated to temperatures of between 800° and 900° C. The supply of the reaction mixture was then switched from the auxiliary feed line 3 to the inlet 12 of the reactor. The reaction of the gasoline now took place in a relatively narrow reaction zone, which could be recognized by the glowing of the spherical corundum and which moved toward the reactor inlet 12 rapidly, even after the air number had been throttled down from 0.35 to 0.2. Also, in this process, the remaining catalytic charge was heated up quickly. After the air supply was throttled down, a fuel gas with a higher calorific value was generated in the reactor, and when the flow of gasoline was at the same time somewhat increased, a fuel gas was obtained which was suited for down, a fuel gas with a higher calorific value was generated in the reactor, and when the flow of gasoline was at the same time somewhat increased, a fuel gas was obtained which was suited for operating the internal combustion engine at partial load, even if not yet at full load.

In this test, an internal combustion engine was not yet connected to the generator. The gasoline, using compressed air and being present in liquid form, was fed into the generator, evaporated there and reacted with the air.

Deviating from the test described in the foregoing, the gasoline/air mixture is normally transported to the internal combustion engine during operation by its own suction; a known device for gasifying, atomizing or also evaporating the gasoline, which is to be drawn in with the air, may be connected in series with the three-way valve 20.

If liquid gasoline is fed to the reaction chamber, which is also possible in operation with an internal combustion engine, the heat required for the evaporation must be supplied by the reaction itself. If in the event of a load change, the gasoline supply is increased rapidly. This can cause the temperature in the reaction chamber to drop below the start up temperature under certain conditions, if the air numbers are below 0.25. In that case, the heater plug 15 is switched on; the "on" signal to do this can be given by the temperature sensor 5. Such load changes are expected, however, only during operation with the internal combustion engine running, where the internal combustion engine can supply the heating energy required for the supplemental heater itself via its electric generator.

The method according to the present invention can also be carried out without temperature measurement during the starting phase. Thus, the experimental generator shown in FIG. 2 has also been started by carrying out the electrical heating and the switching from the auxiliary feed line 3 to the inlet 12 in accordance with a fixed timing plan. The heating time of the start up heater was predetermined and one minute after the start up heater was switched off, the gasoline supply was switched over and at the same time, the throughput was changed to about 0.8 to 3 -l/hr and the air number to about 0.2, i.e., to conditions for continuous operation. At the same time, a thermostat system consisting of the temperature sensor 5 and the heater plug 15 was switched on. With the fuel gas now produced, an internal combustion engine could already be operated at partial load. In tests with a fixed heating time of the start up heater of 10 seconds, ignition occurred only sporadically; with heating times of 15 seconds, only a single misfiring occurred in 5 tests, and heating times of 20 seconds always led to a successful start of the generator.

The generator can also be started by conducting only part of the gasoline/air mixture, after the start up heater is switched off, directly to the hot catalyst volume and by conducting a further part into the reaction chamber via other inlets, e.g., the inlet 12. In this process, a mixture of reacted and unreacted gasoline is produced. However, this mixture is accepted by the internal combustion engine more easily than a mixture of unconverted gasoline and air during the conventional starting of an internal combustion engines. The generator can also be started, for instance, by still retaining the increased air number initially, while the gasoline throughput is increased when the gasoline/air supply is switched from the auxiliary feed line 3 to the inlet 12 of the reactor. Then, the auxiliary feed line can be switched off even earlier and an amount of fuel gas such that the internal combustion engine can be operated at partial load can be fed already at this time to the internal combustion engine. The starting cycle is completed by going to the lower air numbers provided for continuous operation.

The method described here can be applied to particular advantage to motor vehicles, where the starting up of the generator and the internal combustion engine connected thereto can take place in such a manner that with the first operation of the ignition key, the start up heater connected to the starter battery is switched on. In indicator lamp 4 connected to the temperature sensor 4 indicates when the start up temperature has been reached in the subvolume of the catalyst surrounding the start up heater. Via a relay or by further operation of the ignition key, the start up heater 2 is now switched off and the internal combustion engine started at the same time, the suction of which draws a gasoline/air mixture into the generator via the auxiliary feed line 3. After the catalytic charge has been heated up further, the temperature sensor 5 gives a signal to shut off the auxiliary feed line 3, and an indicator lamp connected to the temperature sensor 5 indicates that the generator is now ready for continuous operation also at higher loads. The shutting off of the auxiliary feed line 3 and throttling the air number when going to continuous operation can easily be automated through the use of an electronic control. If the internal combustion engine has exceeded the already mentioned minimum speed and if the electric generator is generating current, the thermostat unit for the reaction chamber, consisting the supplemental heater 15 and the temperature sensor 5 is switched on. Since the supplemental heater prevents the catalytic charge from cooling off, the internal combustion engine can also be fully loaded quickly after the transition to continuous operation is made. With this method of starting the motor vehicle is ready to drive shortly after the beginning of the starting process.

What is claimed is:

1. In a method for starting a gas generator for the catalytic conversion of hydrocarbons with an oxygen containing gas to form a fuel gas and for starting an internal combustion engine which is supplied with the fuel gas, comprising the steps of temporarily electrically heating catalytic material disposed in a reaction chamber containing a catalytic charge, conducting a mixture of hydrocarbons and air, which is richer in oxygen than in continuous operation, over the catalytic material; and exothermically reacting the mixture for further heating up the catalytic charge and feeding the fuel gas produced to the internl combustion engine, the improvement comprising:

(a) electrically heating a small part of the volume of the catalytic charge to the start up temperature of the catalyst;
(b) then terminating the electric heating;
(c) cranking the internal combustion engine;
(d) introducing the hydrocarbon/air mixture and reacting it at the heated small part of the volume without flame causing the catalytic charge to be further heated through the spreading of the exothermic reaction; and
(e) after the remainder of the volume of the catalytic charge is sufficiently heated feeding the hydrocarbons and the oxygen containing gas to the remainder of the volume of the catalytic charge in the generator together along with an oxygen component for the reaction during continuous operation.

2. The method according to claim 1, wherein the amount of hydrocarbons fed in is at first apportioned so that the mixture of fuel gas and possibly unreacted hydrocarbons covers, and does not substantially exceed, the demand of the internal combustion engine when idling.

3. The method according to claim 1 and further including the step of heating the reaction chamber if the temperature drops below the operating temperature, after the internal combustion has exceeded a minimum speed sufficient for driving an electric generator.

4. The method according to claim 1 wherein said small part of the volume of the catalytic charge is in the vicinity of the outlet of the reaction chamber.

5. The method according to claim 4 wherein the fuel-air mixture is fed, at least partially, directly to the heated small part.

6. The method according to claim 5, wherein after the reaction has spread into the catalytic charge, the mixture is fed in via the inlet of the reaction chamber.

* * * * *